Figure 6:
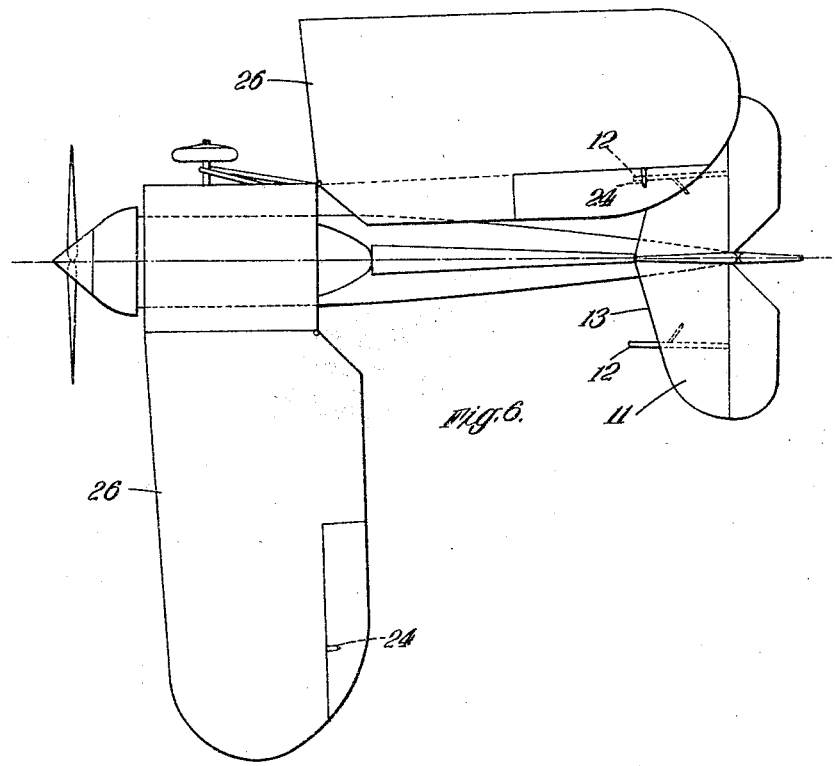

Dec. 13, 1927.  
C. R. FAIREY  
1,652,618  
AEROPLANE AND LIKE AIRCRAFT HAVING FOLDING WINGS  
Filed March 18, 1927   4 Sheets-Sheet 1
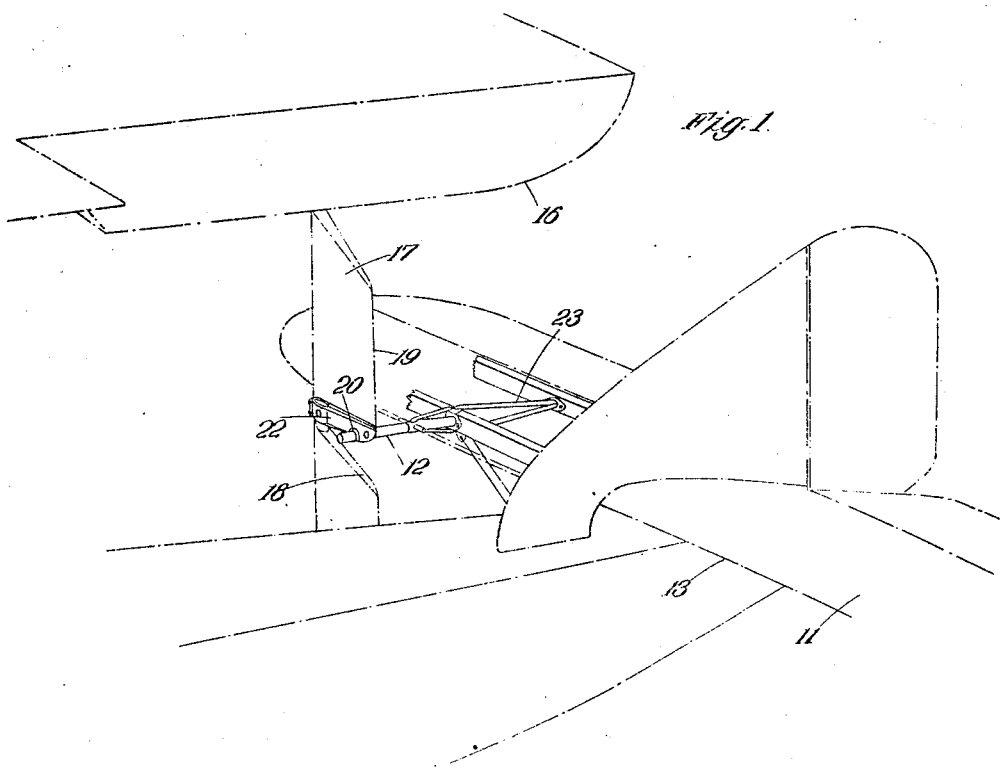
INVENTOR  
CHARLES RICHARD FAIREY  
BY  
ATTORNEYS

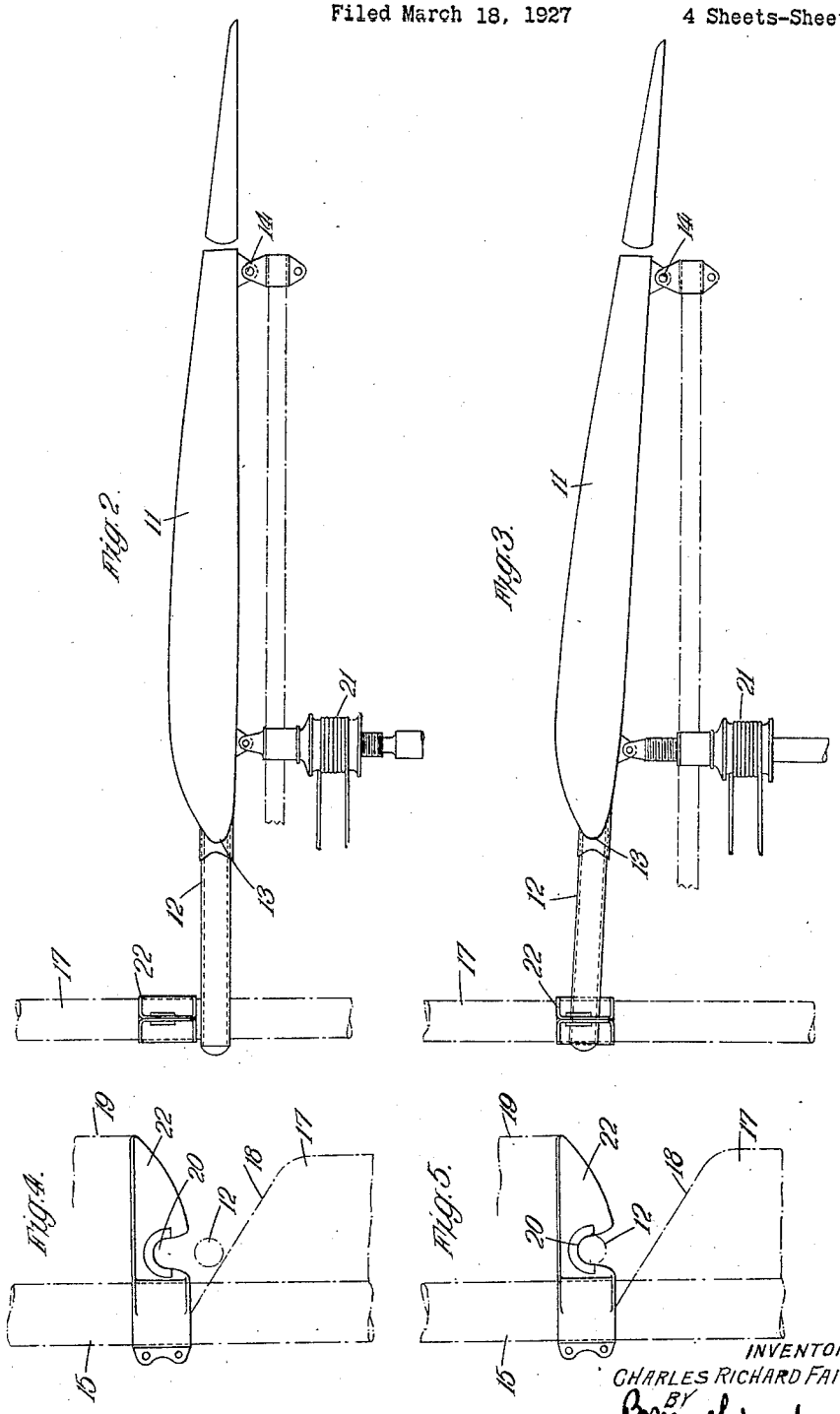

Dec. 13, 1927. 1,652,618
C. R. FAIREY
AEROPLANE AND LIKE AIRCRAFT HAVING FOLDING WINGS
Filed March 18, 1927 4 Sheets-Sheet 3

INVENTOR
CHARLES RICHARD FAIREY
BY
ATTORNEYS

Dec. 13, 1927. 1,652,618
C. R. FAIREY
AEROPLANE AND LIKE AIRCRAFT HAVING FOLDING WINGS
Filed March 18, 1927 4 Sheets-Sheet 4
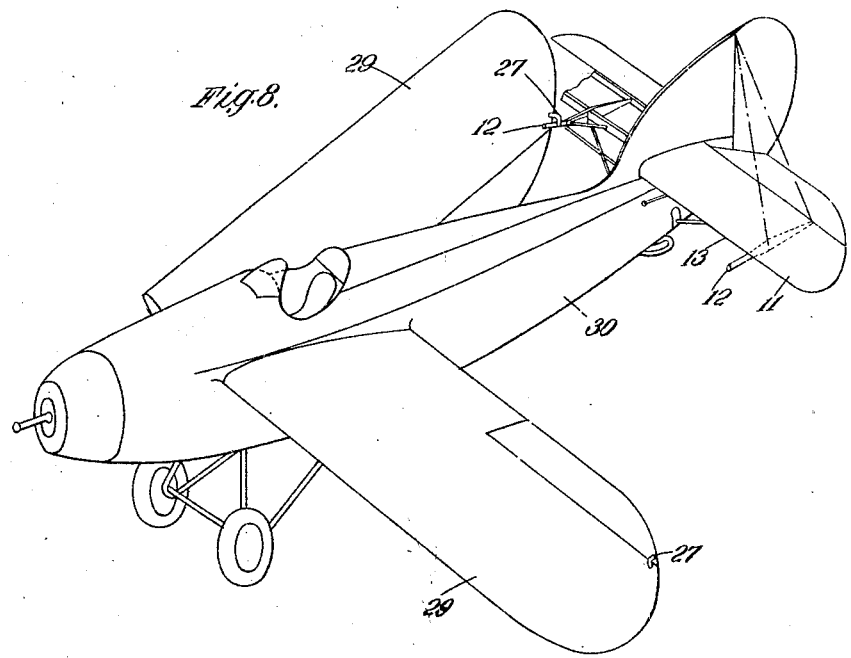
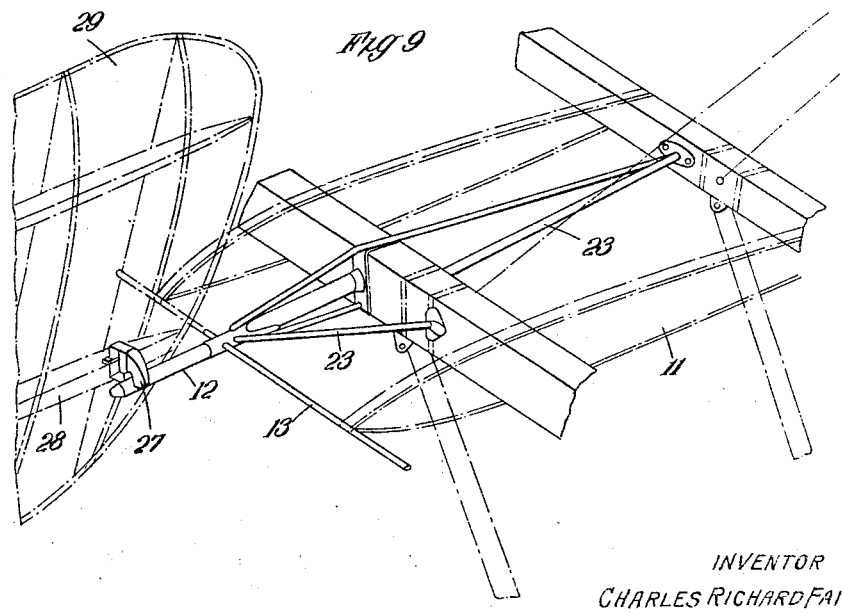
INVENTOR
CHARLES RICHARD FAIREY
BY
ATTORNEYS Patented Dec. 13, 1927.

1,652,618

UNITED STATES PATENT OFFICE.

CHARLES RICHARD FAIREY, OF HAYES, ENGLAND.

AEROPLANE AND LIKE AIRCRAFT HAVING FOLDING WINGS.

Application filed March 18, 1927, Serial No. 176,549, and in Great Britain March 11, 1926.

This invention relates to aeroplanes and like aircraft having wings which are capable of being folded backwards when not in use, and the invention has for its primary object to provide improved means for locking the wings in their folded position.

The invention is especially applicable to machines of the type having a horizontal stabilizer the angle of inclination of which is variable independently of any adjustment of the elevators, and the invention consists essentially in utilizing such variability of the angular position of the horizontal stabilizer, for the purpose of operating, when required, locking means whereby to secure the wings in their folded position, said locking means in some cases serving also to support, partially or wholly, the overhanging weight of the folded wings.

The folding wing-structure at each side of the machine may carry, towards its outer or free end, one member of a locking device whereof the other member is carried by the horizontal stabilizer at the corresponding side of the machine, so that, on the two wing-structures being brought to their folded position, a slight angular movement of the stabilizer in a vertical fore-and-aft plane will cause the members of each locking device to become so mutually interlocked as not only to prevent the restoration of the wings to normal position, but also in some cases (as when the stabilizer has sufficient strength for the purpose) to support, wholly or partially, the free ends of the wings and thus relieve the wing-hinges of overhanging strain. It will be understood that the angular adjustment of the stabilizer may be effected by screw-gear (such as the usual screw-jack) or equivalent means adapted to retain the stabilizer automatically in any angular position to which it may be brought.

Each locking device may comprise, as to the male member, a bolt in the form of a cantilever-arm fixed to some structural element of the stabilizer, and as to the female member, a catch-plate in the form of a hook or notched element mounted on the folding wing-structure and adapted to be engaged from beneath by the bolt; the hook or notch either opening downward or being undercut so as to be adapted to become interlocked with the bolt when the latter is raised as the result of appropriate angular adjustment of the horizontal stabilizer.

Figure 7:
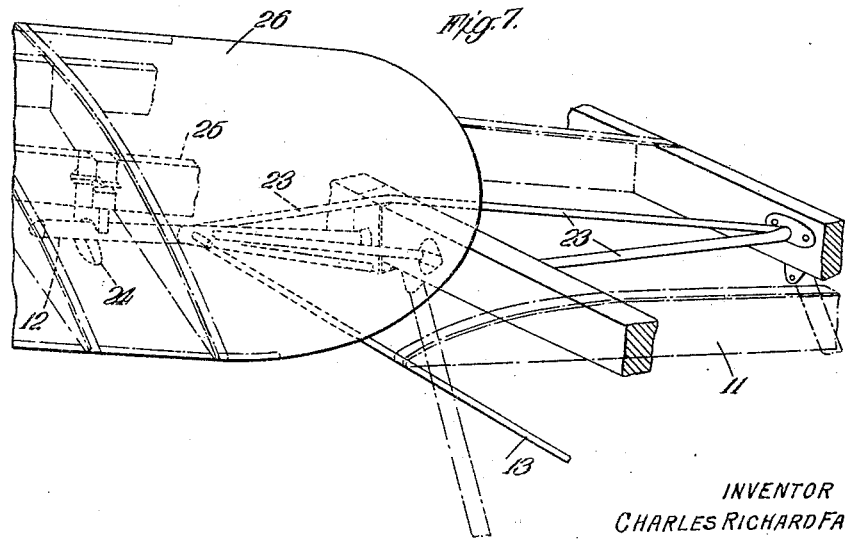

In the accompanying drawings, Figures 1 to 5 illustrate one form of the invention as applied to a machine having two or more superposed pairs of wings (i. e. a biplane, triplane, or multiplane); Figure 1 being a diagrammatic, perspective partial view looking rearward from the left-hand or port side of the machine, with the right-hand or starboard wing-structure folded, whilst Figures 2 and 3 are enlarged diagrammatic side elevations of the adjustable horizontal stabilizer in the "down" and the "up" positions respectively with the wing-structure folded, and Figures 4 and 5 are partial views, looking rearward, corresponding with Figures 2 and 3 respectively, to shew one of the locking devices in the disengaged and engaged conditions. Figures 6 and 7 illustrate a form of the invention as applied to a monoplane whereof the wings are adapted to be folded each in substantially its own plane; Figure 6 being a diagrammatic plan view shewing only the right-hand or starboard wing folded, whilst Figure 7 is an enlarged perspective detail view shewing the action of the locking device. Figures 8 and 9 illustrate a form of the invention as applied to a monoplane whereof each wing is adapted to be turned about the front spar of the wing in addition to the wing as a whole being folded backward about a hinge so as ultimately to lie against the side of the fuselage in a more-or-less vertical fore-and-aft plane with the lower surface of the wing outwards; Figure 8 being a diagrammatic perspective view shewing only the right-hand or starboard wing folded, whilst Figure 9 is an enlarged perspective detail view shewing the action of the locking device.

Referring, first, to the example shewn in Figures 1 to 5, the horizontal stabilizer 11 carries, at each side of the machine, a short rigid arm 12 which projects forward beyond its leading edge 13 in substantially the general plane of the stabilizer (or of one of the stabilizers if more than one is comprised in the tail controlling surfaces), so that both arms 12 will be raised or lowered in accordance with the angular adjustment of the stabilizer 11 about its transverse horizontal axis 14. At each side of the machine an interplane strut 15, serving to couple together the trailing edges of an upper and a lower aileron (an upper aileron 16 being alone shewn in Figure 1), is arranged at such a distance from the wing-hinge axis (not shewn) about which the wings are adapted to be folded, that the fairing 17 of said strut and the forwardly-projecting arm 12 on the stabilizer 11 at the corresponding side of the machine will mutually intersect when the wings are folded back, the median vertical plane of the fairing 17, which normally extends fore-and-aft, then extending athwartship. At the point of such intersection, the fairing 17 of each interplane strut is gapped as at 18 from its rear edge 19 to admit the corresponding arm 12, and the horizontal upper edge of the gap is notched or undercut as at 20 to receive said arm, so that if, after the wings have been folded back, the leading edge 13 of the tail-plane 11 be raised slightly, the arms 12 will enter into interlocking engagement with the notches 20 of the respective strut-fairings 17. Assuming the adjustment of the stabilizer 11 to be effected by means of a screw-jack 21 as usual, it will be obvious that the mutual engagement of the arms 12 and notches 20 will hold the wings securely in their folded position without any strain being thrown upon the devices whereby the screw-jack 21 is controlled, whilst at the same time the weight of the outer ends of the wings will be supported in such manner as to relieve the wing-hinges of overhanging strain. The notched upper edge of the gap 18 in each strut-fairing is preferably reinforced by a metal fitting as shewn at 22, whilst each overhanging arm 12 may be braced to the stabilizer 11 as indicated at 23 in Figure 1.

Referring, now, to the monoplane example illustrated in Figures 6 and 7, it will be seen that in this case the male member or bolt of each locking device consists of a short rigid arm 12 which projects forward beyond the leading edge 13 of the stabilizer 11 and is braced thereto at 23 as in the previous example. The female member consists of a catch-plate 24 which is carried by the rear spar 25 of the wing 26 and projects below the lower surface of the latter; that edge of the catch-plate which is normally towards the rear being gapped and the upper edge of the gap being notched or undercut similarly to the interplane-strut in the previous example, the interlocking action being substantially similar (see particularly Figure 7).

Referring, finally, to the other monoplane example illustrated in Figures 8 and 9, it will be seen that in this case the male member or bolt of each locking device consists, as in the previous examples, of a short rigid arm 12 which projects forward beyond the leading edge 13 of the horizontal stabilizer 11 and is braced thereto at 23 as in the other examples. The female member consists of a catch-plate 27 which is carried by the rear spar 28 of the wing 29 and projects above the upper surface of the latter so as to be presented towards the fuselage 30 when the wing as a whole is turned and folded rearward about its hinge; the then lower edge of each catch-plate being notched to engage over the corresponding arm 12 on the stabilizer 11 when the arms are raised by the adjustment of the tail-plane as before. It will be understood that, in cases where each wing is adapted to be turned about the front or the rear spar of the wing in addition to the wing as a whole being folded backward about a hinge so as ultimately to lie against the side of the fuselage in a more-or-less vertical fore-and-aft plane with the upper (instead of the lower) surface of the wing outwards, a catch-plate substantially similar to that shewn at 27 in Figures 6 and 7 would be attached to the rear spar of the wing so as to project beneath the lower surface of the latter when the wing as a whole is turned and folded rearward about its hinge; the action of the locking device being substantialy similar to that indicated in Figures 6 and 7.

It will be obvious that the invention is equally applicable whether the stabilizer screw-jack operates on the front or the rear spar of the tail-plane.

It will be perceived that the invention, in any of its forms, involves the addition of little or no extra weight to the machine, eliminates the extra head-resistance incidental to locking devices previously proposed, and avoids the use of the somewhat heavy and inaccessible contrivances, relatively complicated in control, which have heretofore been proposed for the same purpose.

Having now particularly described and ascertained the nature of my said invention and in what manner the same is to be performed, I declare that what I claim is:—

1. In an aeroplane or like aircraft having wing structures adapted to fold rearwardly when not in use, and having a horizontal stabilizer whereof the angle of inclination is variable; locking members secured to said wing structures, and cooperating locking members fixed to said stabilizer and adapted to be moved therewith into engagement with said first mentioned locking members whereby to secure the wings in their folded position.

2. An aeroplane or like aircraft, as claimed in claim 1, wherein the second mentioned locking members are adapted to support a part of the weight of the folded wings.

3. An aeroplane or like aircraft, as claimed in claim 1, wherein the first mentioned locking device consists of rigid members carried by the horizontal stabilizer and extending forwardly thereof to be raised and lowered when the said stabilizer is manipulated, the second mentioned locking devices consisting of elements mounted on the folding wing structures and having downwardly opening recesses adapted to receive said rigid members so as to become interlocked with the rigid members when the latter are raised.

4. In an aeroplane or like aircraft having wing structures adapted to fold rearwardly substantially in their own planes, and having a horizontal stabilizer and means for varying the inclination thereof; female members attached to said wing structures and having downwardly opening recesses, and male members fixed to said stabilizer and being thereby adapted to be moved upwardly to engage in said recesses and lock the wings in their folded position.

5. In an aeroplane having wing structures adapted to fold rearwardly and having a stabilizer mounted for pivotal movement about an axis transverse to the aeroplane; a pair of locking members attached to said wing structures, and a pair of cooperating locking members fixed to said stabilizer and adapted to engage the first mentioned pair of locking members, and means for tilting said stabilizer to cause said locking members to engage and disengage each other.

CHARLES RICHARD FAIREY.